US011407529B1

(12) United States Patent
Barnes (10) Patent No.: US 11,407,529 B1
(45) Date of Patent: Aug. 9, 2022

(54) AIRCRAFT RETROFIT SYSTEM (71) Applicant: John P. Barnes, San Pedro, CA (US)

(72) Inventor: John P. Barnes, San Pedro, CA (US)

(73) Assignee: NORTHROP GRUMMAN SYSTEMS CORPORATION, Falls Church, VA (US)

(*) Notice: Subject to any disclaimer, the term of this patent is extended or adjusted under 35 U.S.C. 154(b) by 360 days.

(21) Appl. No.: 16/660,367

(22) Filed: Oct. 22, 2019

(51) Int. Cl.
*B64F 5/40* (2017.01)
*B64D 33/00* (2006.01)
*B64D 13/06* (2006.01)

(52) U.S. Cl.
CPC ............... *B64F 5/40* (2017.01); *B64D 33/00* (2013.01); *B64D 2013/0611* (2013.01); *B64D 2013/0614* (2013.01); *B64D 2013/0618* (2013.01); *B64D 2221/00* (2013.01); *F05D 2230/80* (2013.01)

(58) Field of Classification Search
CPC ... B64F 5/40; B64D 33/00; B64D 2013/0611; B64D 2013/0614; B64D 2013/0618; B64D 2221/00; F05D 2230/80; B64C 15/00; B64C 15/02
See application file for complete search history.

(56) References Cited

U.S. PATENT DOCUMENTS

| 2,676,114 | A | | 4/1954 | Barkley |
| 2,834,723 | A | | 5/1958 | Robinson |
| 2,925,215 | A | * | 2/1960 | Weatherbee .......... F01D 25/125 417/323 |
| 3,201,236 | A | | 8/1965 | Hill |
| 3,627,569 | A | | 12/1971 | Beecham |
| 4,000,045 | A | | 12/1976 | Rotzow |
| 4,469,719 | A | | 9/1984 | Martin |
| 4,512,854 | A | | 4/1985 | Grah |
| 5,150,839 | A | * | 9/1992 | Reedy .................... F02K 1/008 239/265.41 |
| 5,175,023 | A | | 12/1992 | Iwase |
| 6,508,980 | B1 | | 1/2003 | Sachs et al. |

(Continued)

FOREIGN PATENT DOCUMENTS

| CN | 102133925 A | * | 1/2010 | |
| GB | 2282353 | * | 5/1995 | ............. B64C 15/00 |

OTHER PUBLICATIONS

Lockie, A. (Jan. 18, 2017). Boeing has an updated F-18 in the works—here's how it's 'comparable' to the F-35. Business Insider, https://www.businessinsider.com/boeing-updated-f18-comparable-f35-advanced-super-hornet-2017-1.*

(Continued)

*Primary Examiner* — Philip J Bonzell
*Assistant Examiner* — Ashesh Dangol
(74) *Attorney, Agent, or Firm* — Tarolli, Sundheim, Covell & Tummino LLP (57) ABSTRACT

One example includes an aircraft retrofit system to provide a retrofitted aircraft from an original aircraft. The system includes a plurality of multi-axis vectoring nozzles configured to replace a respective plurality of original nozzles of a respective plurality of original engines of the original aircraft and empennage of the original aircraft, such that the retrofitted aircraft includes no empennage. The system also includes retrofit electronics for controlling the plurality of multi-axis vectoring nozzles to provide yaw control of the retrofitted aircraft.

7 Claims, 7 Drawing Sheets

(56) References Cited

U.S. PATENT DOCUMENTS

| | | | |
|---|---|---|---|
| 7,145,836 B1* | 12/2006 | Christoff | G01V 1/116 367/142 |
| 8,148,830 B2 | 4/2012 | Bedinger et al. | |
| 8,163,337 B2 | 4/2012 | Guerin et al. | |
| 2002/0059903 A1 | 5/2002 | Hasegawa et al. | |
| 2002/0113167 A1* | 8/2002 | Albero | F02C 7/32 244/53 R |
| 2003/0135981 A1 | 7/2003 | Galyean | |
| 2004/0012401 A1 | 1/2004 | King et al. | |
| 2004/0018107 A1 | 1/2004 | Khoshnevis | |
| 2004/0231999 A1 | 11/2004 | Morrissey | |
| 2009/0078825 A1* | 3/2009 | Eggink | B64F 5/10 244/123.1 |
| 2009/0321577 A1* | 12/2009 | Vinicius | B64D 37/005 244/135 R |
| 2010/0038118 A1 | 2/2010 | Fan | |
| 2012/0153285 A1 | 6/2012 | James et al. | |
| 2013/0341465 A1* | 12/2013 | Massey | B64D 37/32 244/134 R |
| 2016/0174364 A1 | 6/2016 | Harkness, Jr. et al. | |
| 2017/0194171 A1 | 7/2017 | Peterson et al. | |

OTHER PUBLICATIONS

Ferguson and German. "Powder Shaping and Consolidation Technologies". ASM Handbook. vol. 7. 1998, pp. 313-320. (Year: 1998).

* cited by examiner

AIRCRAFT RETROFIT SYSTEM

TECHNICAL FIELD

The present disclosure relates generally to aviation systems, and specifically to an aircraft retrofit system.

BACKGROUND

Military operations have become increasingly more reliant on aircraft since the dawn of aviation. Military aircraft are designed to perform a variety of different tasks, such as performing combat roles, reconnaissance, communications, communications interference, and transportation. There are currently thousands of active military aircraft that are still in service. Many such military aircraft vehicles are decades old, and while still functional and capable of performing certain mission goals, are equipped with outdated technologies and/or are approaching obsolescence. As a result, such outdated military aircraft designs are becoming less effective for performing designated mission objectives. New military aircraft are notoriously expensive, with "clean sheet" designs typically costing several hundred million dollars.

SUMMARY

One example includes an aircraft retrofit system to provide a retrofitted aircraft from an original aircraft. The system includes a plurality of multi-axis vectoring nozzles configured to replace a respective plurality of original nozzles of a respective plurality of original engines of the original aircraft and empennage of the original aircraft, such that the retrofitted aircraft includes no empennage. The system also includes retrofit electronics for controlling the plurality of multi-axis vectoring nozzles to provide yaw control of the retrofitted aircraft.

Another example includes a method for retrofitting an original aircraft to provide a retrofitted aircraft. The method includes removing empennage of the original aircraft. The method also includes replacing a plurality of original nozzles of a respective plurality of original engines of the original aircraft with a respective plurality of multi-axis vectoring nozzles. The method further includes installing electronics for controlling the plurality of multi-axis vectoring nozzles to provide yaw control of the retrofitted aircraft.

Another example includes a method for retrofitting an original aircraft to provide a retrofitted aircraft. The method includes replacing a plurality of original nozzles of a respective plurality of original engines of the original aircraft with a respective plurality of multi-axis vectoring nozzles. The method also includes installing electronics for controlling the plurality of multi-axis vectoring nozzles to provide yaw control of the retrofitted aircraft. The method further includes replacing original wings of the original aircraft with a set of retrofit wings that are larger than the respective original wings. Each of the retrofit wings includes an internal fuel tank to store a greater amount of fuel than the original wings of the original aircraft and a plurality of ailerons configured to provide yaw control of the retrofitted aircraft.

DETAILED DESCRIPTION

The present disclosure relates generally to aviation systems, and specifically to an aircraft retrofit system. The aircraft retrofit system is intended to retrofit certain portions of an existing aircraft (hereinafter "original aircraft") to result in an upgraded aircraft (hereinafter "retrofitted aircraft"). By retrofitting the original aircraft, the retrofitted aircraft can have significantly more updated technological features to improve performance of the retrofitted aircraft relative to the original aircraft. Additionally, by only retrofitting certain portions of the original aircraft, the cost of the retrofitted aircraft can be significantly reduced relative to the cost of a newly constructed "clean sheet" aircraft, such as by approximately half. Therefore, by implementing the aircraft retrofit system, the retrofitted aircraft can be constructed in a significantly less expensive and less wasteful manner than a newly constructed equivalent aircraft.

As an example, the aircraft retrofit system can be implemented to generate a retrofitted aircraft from an original aircraft that corresponds to an F-18 SuperHornet variant (e.g., an F/A-18E, F/A-18F, or an EA-18G). As a result, potentially hundreds of in-service F-18 Hornet fighter jets can be converted to the retrofitted aircraft, thus providing significant performance enhancement to the existing F-18 SuperHornet fighter jets in a manner that is significantly less expensive than manufacturing entirely new fighter jets. The aircraft retrofit system includes a set of multi-axis-thrust-vectoring nozzles that are intended to replace original nozzles of the engines of the original aircraft. As an example, the empennage of the original aircraft can be removed, such that the vectoring nozzles of the aircraft retrofit system can provide primary yaw, roll, and pitch control of the retrofitted aircraft. For example, because the original aircraft (e.g., the F-18 SuperHornet variant) can include two closely-spaced engines, the retrofitted aircraft can provide primary yaw control via either or both vectoring nozzles, thus obviating the need for empennage that adds weight, aerodynamic drag, and greater visibility to radar. The aircraft retrofit system can thus also include retrofit electronics to control the vectoring nozzles.

As another example, the aircraft retrofit system can include a set of retrofit wings that are intended to replace the original wings of the original aircraft. For example, the retrofit wings can be larger than the original wings, such as to internally store a greater amount of fuel than the original wings of the original aircraft. As another example, the retrofit wings can include a plurality of ailerons to provide both maneuvering of the retrofitted aircraft, as well as additional yaw control. For example, the ailerons can include a set of split ailerons to provide additional yaw control for the retrofitted aircraft.

Furthermore, the aircraft retrofit system can include additional improvements, such as to support additional and/or future upgrades for the retrofitted aircraft. For example, the aircraft retrofit system can also include auxiliary compressors and/or can include a plurality of retrofit starter generators, such as operating from the engines of the original aircraft, as well as auxiliary power units (APUs). As an example, the auxiliary compressors can be configured to provide cleaner air for cooling the retrofitted aircraft, and the retrofit starter generators can provide additional power for electrical systems on the retrofitted aircraft. As another example, ram-air exit stacks associated with engine bleed air from a heat exchanger can be exchanged with the additional APUs. As a result, the retrofitted aircraft can accommodate electrical demands and ordnance. For example, the retrofitted aircraft can be able to accommodate the electrical power and cooling requirements of continuously-fired directed energy (DE) weapons.

Figure 1:
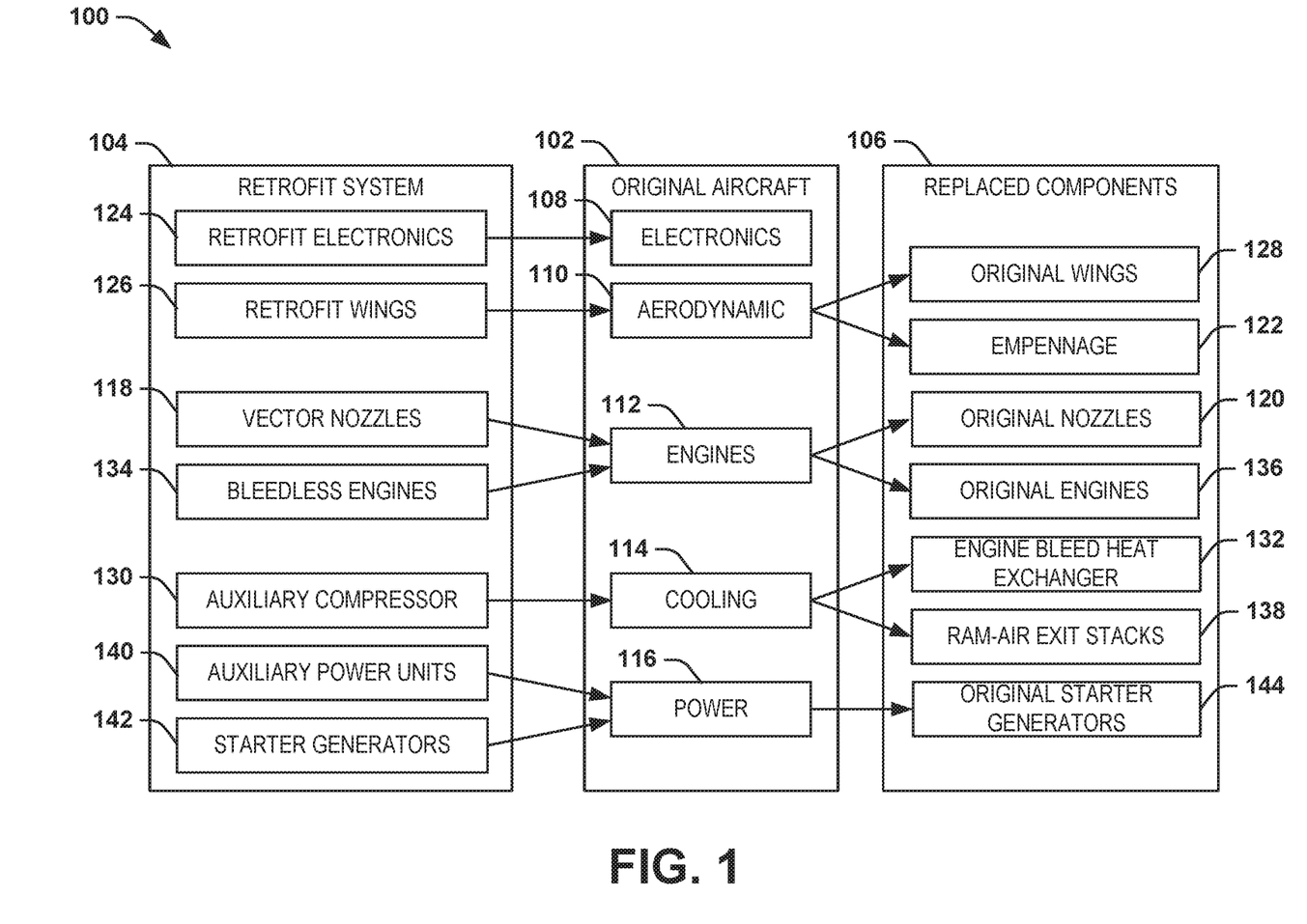
FIG. 1 illustrates an example diagram of retrofitting an original aircraft with an aircraft retrofit system.

FIG. 1 illustrates an example diagram 100 of retrofitting an original aircraft with an aircraft retrofit system. The retrofitting of the original aircraft, demonstrated in the example of FIG. 1 at 102, can result in a retrofitted aircraft. The diagram 100 demonstrates the original aircraft 102 with several components that are affected by the retrofit based on the addition of several components from the aircraft retrofit system, demonstrated in the example of FIG. 1 at 104. The diagram 100 also shows a set of components that are replaced components, demonstrated in the example of FIG. 1 at 106, that correspond to components that are removed from the original aircraft 102 during the retrofit process.

In the example of FIG. 1, the original aircraft 102 includes electronics 108, aerodynamic features 110, engines 112, a cooling system 114, and a power system 116 that are affected by the retrofitting of the aircraft retrofit system 104 to the original aircraft 102. The aircraft retrofit system 104 includes a set of vectoring nozzles 118 (e.g., axisymmetric multi-axis pitch-and-yaw-vectoring nozzles) that are intended to replace original nozzles 120 of the engines 112 of the original aircraft 102. As an example, the engines 112 can also be provided with enlarged "fueldraulic" pumps for controlling the set of vectoring nozzles 118. Additionally, in the example of FIG. 1, the empennage 122 of the original aircraft 102 can be removed (e.g., from the aerodynamic features 110), such that the vectoring nozzles 118 of the aircraft retrofit system 104 can provide primary yaw control of the retrofitted aircraft. The empennage 122 is thus demonstrated in the replaced components 106, having been removed from the original aircraft 102. As an example, because the original aircraft 102 can include two closely coupled engines, the retrofitted aircraft can provide primary yaw control via the vectoring nozzles 118, thus obviating the need for empennage 122 that adds weight, aerodynamic drag, and greater visibility to radar. The aircraft retrofit system 104 includes retrofit electronics 124 that are added to the electronics 108 of the original aircraft 102 to provide control of the vectoring nozzles 118.

As another example, the aircraft retrofit system 104 includes retrofit wings 126 that are intended to replace original wings 128 of the original aircraft 102, which are thus demonstrated in the replaced components 106. For example, the retrofit wings 126 can be larger than the original wings 128, such as to internally store a greater amount of fuel than the original wings 128 of the original aircraft 102. As another example and as described in greater detail herein, the retrofit wings 118 can include a plurality of ailerons and flaps to provide supplementary yaw, roll, and pitch control. For example, the ailerons of the retrofit wings 126 can include a set of split ailerons to provide additional yaw control for the retrofitted aircraft. Furthermore, the retrofit wings 126 can also include auxiliary power unit (APU) bleed jets to provide yet an additional yaw control capability. As another example, the retrofit wings 126 can include a wing-fold, such as for aircraft carrier-based operations.

As another example, the aircraft retrofit system 104 is demonstrated as including an auxiliary compressor 130. The auxiliary compressor 130 can be incorporated into the existing cooling system 114 configured to provide a clean source of air for cooling for the retrofitted aircraft. As an example, the auxiliary compressor 130 can be incorporated into a ram-air inlet on the fuselage of the original aircraft 102 (e.g., upstream of the face of each of the engines of the engines 112). For example, the auxiliary compressor 130 can replace an engine-bleed heat exchanger 132 that can be included in the ram-air inlet of the original aircraft 102. In addition, the aircraft retrofit system 104 demonstrates bleed-less engines 134 that can replace original engines 136 on the original aircraft 102. Therefore, the example of FIG. 1 demonstrates the engine-bleed heat exchanger 132 and the original engines 136 being included in the replaced components 106.

For example, in the original aircraft 102, the original engines 136 may have included engine bleed-air in the engine-bleed heat exchanger 132 to provide pressurized air to an air cycle machine (ACM) to cool a number of systems of the original aircraft 102 that required cooling, such as including the cockpit. However, given the engine-bleed air can include potentially hazardous particulate (e.g., smoke, oil, etc.), which may be harmful to the pilot and/or systems of the original aircraft 102 that need to be cooled. However, the auxiliary compressor 130 can instead generate pressurized air based on the ram-air that enters the ram-air inlet, as opposed to using engine-bleed air. Therefore, by replacing the engine-bleed heat exchanger 132 with the auxiliary compressor 130 and using the cleaner air provided from the auxiliary compressor 130 to the ACM, the cockpit and other aircraft systems can be cooled with "cleaner" air than the engine-bleed air. For example, because ram-air temperature can vary greatly with flight condition, the auxiliary compressor 130 can be configured as a variable-RPM device.

In addition, by replacing the original engines 136 with the bleedless engines 134, the retrofitted aircraft can achieve other advantages regarding power. As a first example, the bleedless engines 134 can provide for a more energy efficient electrical start and operation, as well as providing a greater impact on the electric cabin system (ECS). For example, the bleedless engines 134 can provide an exchange of bleed-air-extraction in the original aircraft 102 with a more efficient shaft-power extraction in the retrofitted aircraft, such as to provide approximately 20% enhanced fuel economy and approximately 20% thrust growth in the center of the flight envelope. As another example, because the retrofitted aircraft does not implement engine-bleed air for cooling, the retrofitted aircraft does not need ram-air exit stacks, demonstrated in the example of FIG. 1 at 138 in the replaced components 106 from the cooling system 114) to vent the ram-air resulting from the engine-bleed heat exchanger 132. Therefore, in the example of FIG. 1, the aircraft retrofit system 104 can include auxiliary power units (APUs) 140 that are added to the power system 116 of the original aircraft 102 to provide additional power to the retrofitted aircraft. As an example, the APUs 140 can replace the ram-air exit stacks 138 to provide additional power to the retrofitted aircraft. For example, the APUs 140 can be flight-continuous APUs based on receiving air at the ports formerly associated with the ram-air exit stacks 138, and can provide shaft power to provide sustained auxiliary electrical power and environmental control on the ground, as well as in-flight engine starting and emergency power.

As another example, the aircraft retrofit system 104 can also include a plurality of retrofit starter generators 142 that can be added to the power system 116 of the original aircraft 102, such as to replace original starter generators 144. The retrofit starter generators 142 can be operated from the engines 112 (e.g., the bleedless engines 134) to provide additional power for electrical systems on the retrofitted aircraft. For example, the retrofit aircraft can include a quantity of four retrofit starter generators 142 that can each provide approximately 120 kW, as opposed to a quantity two of the original starter generators 144 that can each provide approximately 65 kW. As a result, based on the addition of the APUs 140 and the retrofit starter generators 142, the retrofitted aircraft can accommodate substantially-increased electrical demands, including those of enhanced ordnance. For example, based on an increased power output capability from the power system 116 and an improved cooling capability of the cooling system 114 from the aircraft retrofit system 104, the retrofitted aircraft can be able to accommodate the electrical power and cooling requirements of directed energy (DE) weapons.

As described herein, the aircraft retrofit system 104 can be implemented to generate a retrofitted aircraft from an original aircraft that corresponds to one of the F-18 SuperHornet variants (e.g., an F/A-18E or F/A-18F or an EA-18G). As a result, potentially hundreds of in-service F-18 SuperHornet fighter jets can be converted to the retrofitted aircraft, thus providing significant performance enhancement to the existing F-18 SuperHornet fighter jets in a manner that is significantly less expensive than manufacturing entirely new fighter jets. For example, the aircraft retrofit system 104 does not include any componentry that would involve replacing the fuselage or cockpit of the original aircraft 102. As a result, the original engines (e.g., fitted with vectoring nozzles), fuselage, and cockpit of the original aircraft 102 can be reused for the retrofitted aircraft, thus resulting in significant reductions in cost of manufacturing the retrofitted aircraft.

As an example, the retrofit process of the original aircraft 102 can be performed in stages. For example, a first stage can include changes to the aerodynamic features 110 and to the original engines 112, as well as supporting electronics 108. As an example, the first stage of the retrofit process can provide for a retrofitted aircraft in which the original nozzles 120 of the engines 112 of the original aircraft 102 are replaced by the set of vectoring nozzles 118 (e.g., including the addition of the retrofit electronics 124), the empennage 122 has been removed, and the original wings 128 of the original aircraft 102 have been replaced by the retrofit wings 126. Therefore, the first stage of the retrofit process can be directed more to an aero-propulsion transformation of the original aircraft 102. Therefore, the second stage can be directed more to a weapons and subsystems transformation of the original aircraft 102. For example, the second stage can include the retrofitting of the components in the cooling system 114 and the power system 116, as described previously, as well as the replacement of the original engines 136 with the bleedless engines 134. Accordingly, the retrofit process can be staged for greater cost-effectiveness and time efficiency in providing the first stage, as well as allowing for the inclusion of developing technologies (e.g., DE weapons) in providing the second stage.

Figure 2:
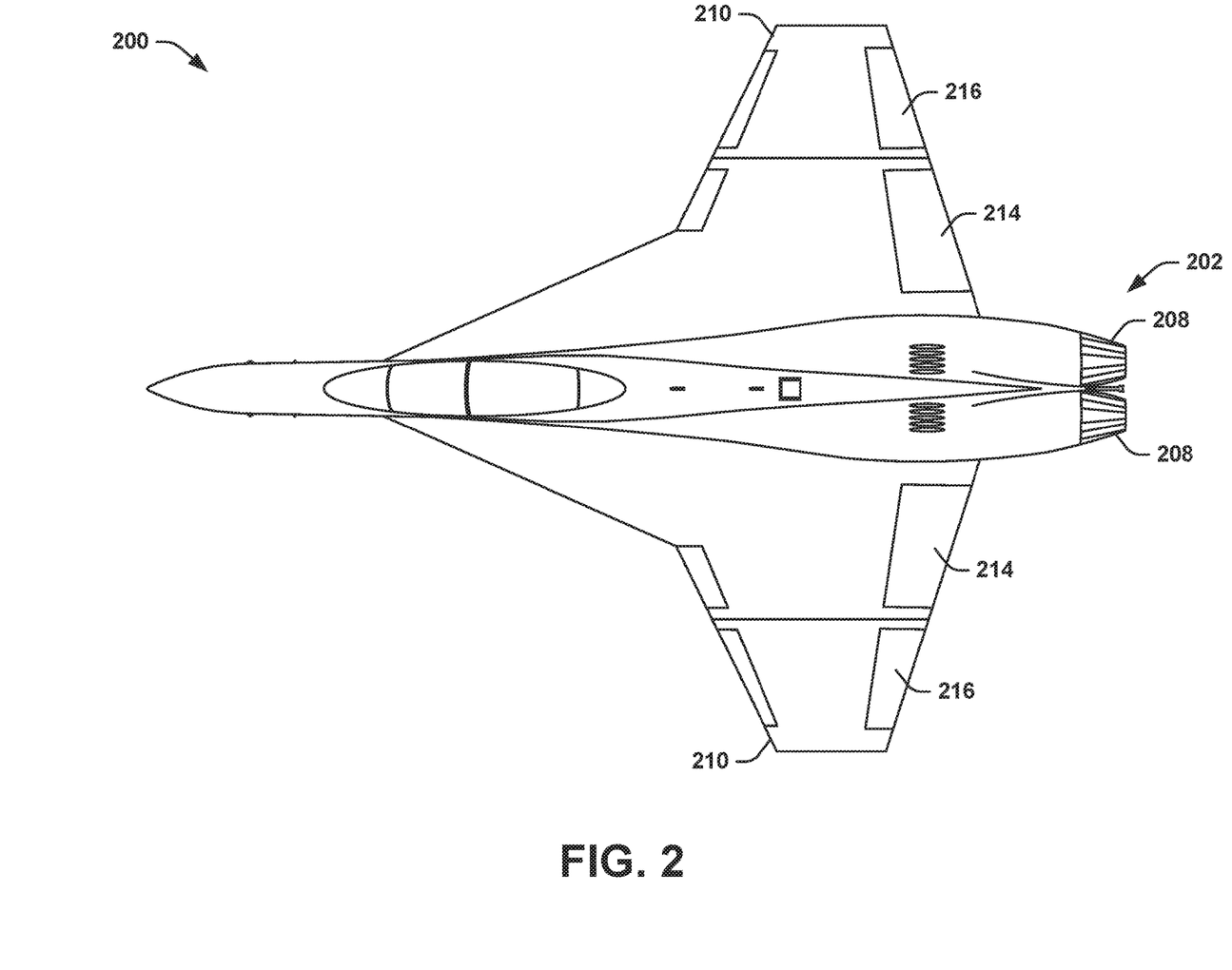
FIG. 2 illustrates an example of a retrofitted aircraft.
Figure 3:
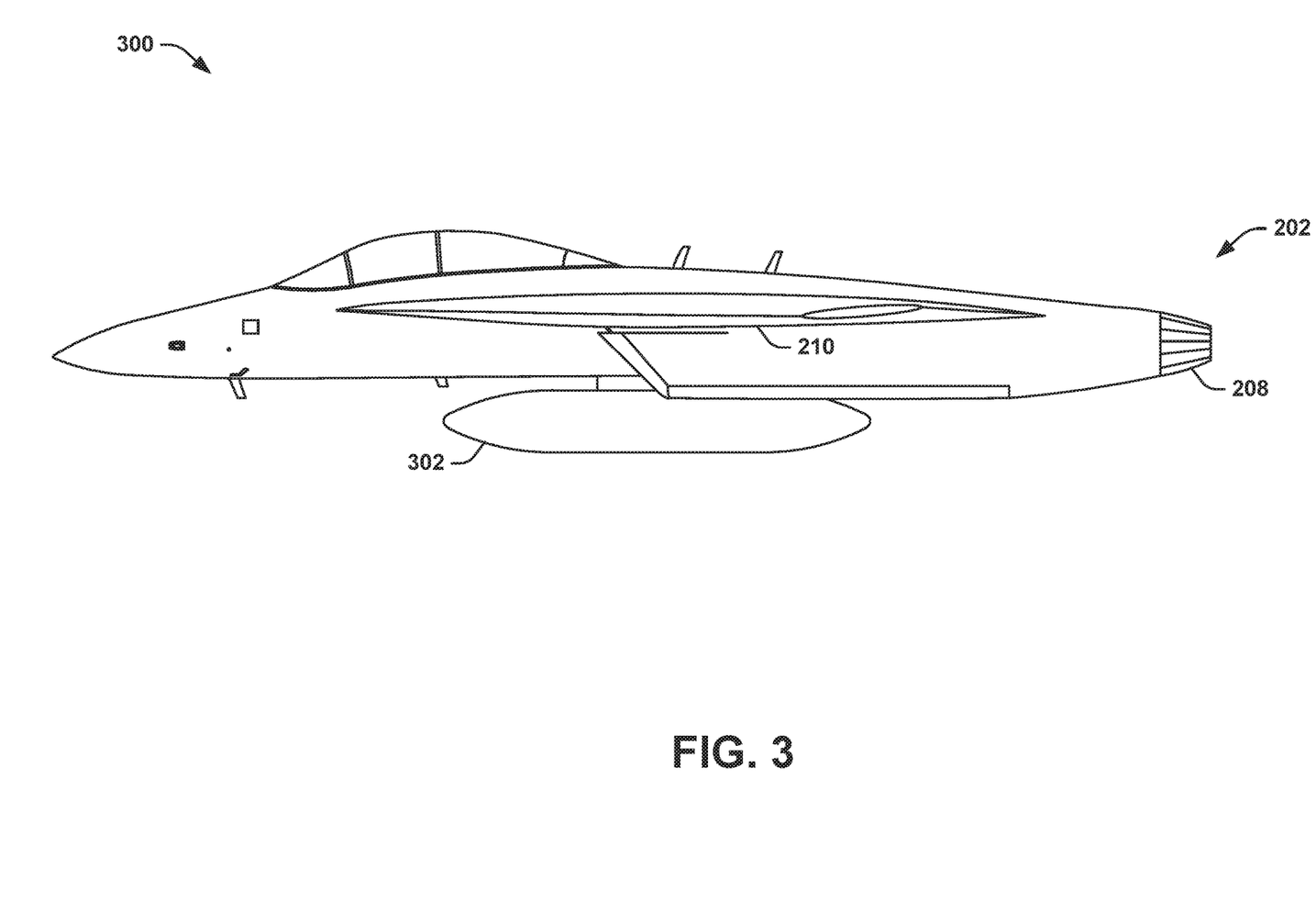
FIG. 3 illustrates another example of a retrofitted aircraft.
Figure 4:
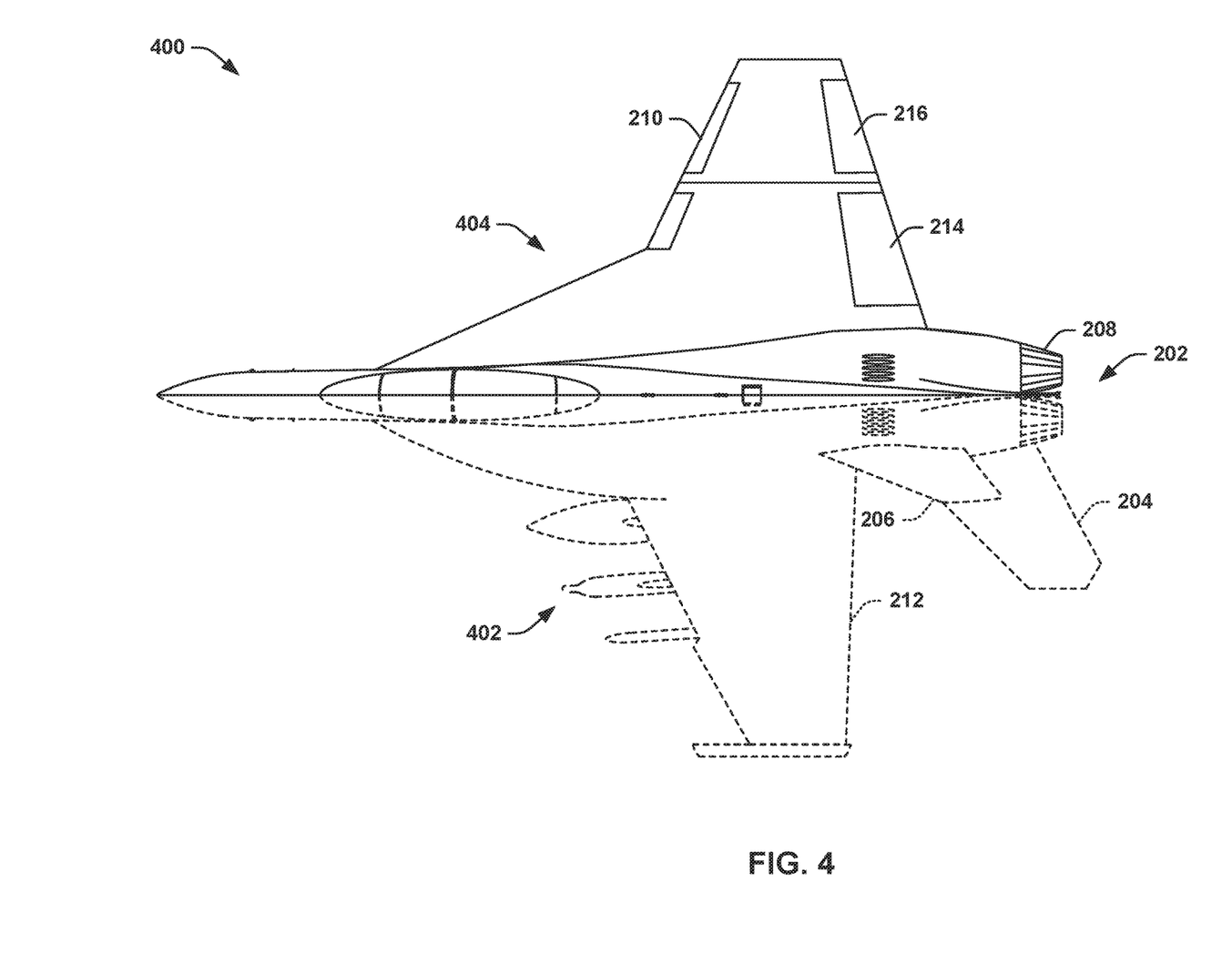
FIG. 4 illustrates another example diagram of retrofitting an original aircraft with an aircraft retrofit system.

FIGS. 2 and 3 illustrate examples of a retrofitted aircraft 200 and 300, respectively. The retrofitted aircraft 200 is demonstrated in an overhead view, while the retrofitted aircraft 300 is demonstrated in a side view. Additionally, FIG. 4 illustrates another example diagram 400 of retrofitting an original aircraft with an aircraft retrofit system. The diagram 400 demonstrates a split overhead view of the original aircraft 402 on the left side (with respect to the forward facing of the aircraft), demonstrated in dashed lines, and the retrofitted aircraft 404 on the right side (with respect to the forward facing of the aircraft), demonstrated in solid lines. The retrofitted aircraft 200, 300, and 404 can correspond to retrofitting an F-18 SuperHornet variant (e.g., an F/A-18E, F/A-18F, or an EA-18G) as the original aircraft 402 via an aircraft retrofit system 104. Therefore, reference is to be made to the example of FIG. 1 in the following description of the examples of FIGS. 2-4.

The retrofitted aircraft 200, 300, and 404 includes an afterbody, demonstrated generally at 202, that has no empennage. For example, the retrofitting method can include removing the empennage of the original aircraft 202, demonstrated as including tailfins 204 and tailplanes 206. In addition, the retrofitting method can include replacing original nozzles of a pair of engines (e.g., turbofan engines), demonstrated at 208, with respective multi-axis vectoring nozzles. As a result, based on the removal of the tailfins 204 and tailplanes 206, the vectoring nozzles of the aircraft retrofit system 104 can provide primary yaw, roll, and pitch control of the retrofitted aircraft 200, 300, and 404, as well as improved maneuverability at lower speeds.

In addition, the aircraft retrofit system 104 includes a set of retrofit wings demonstrated at 210, such that the original wings, demonstrated at 212, are removed to accommodate the retrofit wings 210. Therefore, in the examples of FIGS. 2-4, the retrofitted aircraft 200, 300, and 404 includes the retrofit wings 210 that are larger than the original wings 212. As an example, the larger retrofit wings 210 can have a larger fuel capacity, and can therefore store a greater amount of fuel than the original wings 212 of the original aircraft 202. For example, the reconfiguration of the retrofit wings 210 combined with the increase in fuel can result in approximately 25% additional operational range. In the examples of FIGS. 2 and 4, the retrofit wings 210 include a first set of ailerons 214 and a second set of ailerons 216. As an example, the first set of ailerons 214 can provide maneuvering of the retrofitted aircraft 200, 300, and 404. As another example, the second set of ailerons 216 can be configured as split ailerons, such as to provide supplemental or emergency yaw control of the retrofitted aircraft 200, 300, and 404. Furthermore, as yet another example, the retrofit wings 214 can also include APU bleed jets (not shown) to provide additional yaw control capability via pneumatic valves associated with the APU bleed jets which can be directed aft and operated differentially to control yaw.

Additionally, in the example of FIG. 3, the retrofitted aircraft 300 is demonstrated as including a fuselage pod 302. For example, the fuselage pod 302 can include any of a variety of electronic payload equipment, such as an electronic warfare payload. As an example, the fuselage pod 302 can include communications and/or communications interference electronic equipment. For example, the electronic warfare payload in the fuselage pod 302 can include electromagnetic spectrum jamming or spoofing transmitters. As another example, the fuselage pod 102 can include a directed energy (DE) weapon. The fuselage pod 302 can thus host a payload for the retrofitted aircraft 200, 300, and 404 in a location other than underwing to reduce drag and mitigate detection by radar.

The examples of FIGS. 2-4 demonstrate aero-propulsion transformation of the original aircraft 202 (e.g., the first stage of the retrofit) that is based on removing all empennage, as well as enlarging and re-shaping the wings for more fuel and range, as well as providing less visibility to adverse radar or other manners of detection. Additionally, the axisymmetric pitch-and-yaw-vectoring nozzles providing primary flight control can stabilize and maneuver the retrofitted aircraft 200, 300, and 404, throughout most or all of the flight envelope, with supplementary flight control provided at high speed if necessary. The larger retrofit wings 212 provide enlarged leading-edge extension (LEX), such as to promote engine/inlet operability at high angle of attack. Therefore, the larger and re-shaped retrofit wings 212 can provide both greater range and greater low-speed maneuverability of the retrofitted aircraft 200, 300, and 404.

Figure 5:
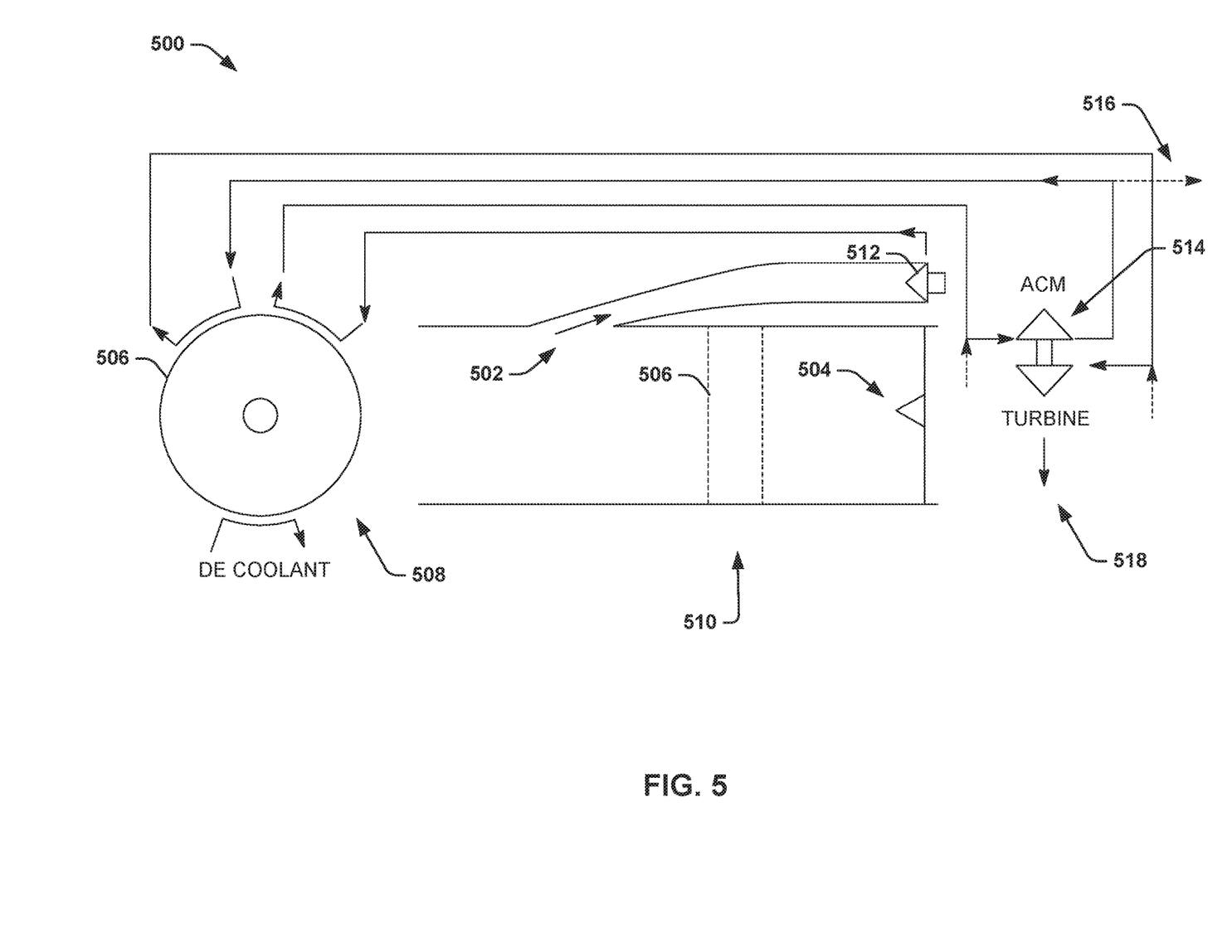
FIG. 5 illustrates an example diagram of a retrofit air inlet heat exchange system.

FIG. 5 illustrates an example diagram of a retrofit air inlet heat exchange system 500. The retrofit air inlet heat exchange system 500 can be a part of the cooling system 114 in the example of FIG. 1. Therefore, reference is to be made to the example of FIG. 1 in the following description of the example of FIG. 5. For example, the retrofit air inlet heat exchange system 500 can be implemented during a second retrofit stage of the aircraft retrofit system (e.g., weapons and subsystems transformation).

The retrofit air inlet heat exchange system 500 demonstrates an air inlet 502 at a location that is proximal to a face of one of engines 504 (e.g., the turbofan engines 208 in the examples of FIGS. 2-4). As the retrofitted aircraft flies, air is provided into the air-inlet 502, in a manner similar to an air-breathing engine (e.g., a ramjet). As an example, the air inlet 502 can be included in the fuselage of the original aircraft 102 as one of a pair of ram-air inlets corresponding to each of the respective engines 208. The retrofit air inlet heat exchange system 500 also includes an engine-face heat exchanger 506 that is demonstrated in a first view 508 and a second view 510. The second view 510 is demonstrated as a "side" view relative to the first view 508, such that the engine-face heat exchanger 506 is demonstrated as being downstream of the air-inlet 502 and upstream of the engine 504. Due to the benefits of the engine-face heat exchanger 506, continuous operation with continuous thermal management can be provided, whether the platform is to emit spectrum-domination or directed energy.

In the example of FIG. 5, the air that is provided in the air inlet 502 is provided to an auxiliary compressor 512 (e.g., electrically powered) that can be part of the aircraft retrofit system 104 which, including an air-cycle machine (ACM) 514, cools the air to sub-freezing temperatures. As an example, the auxiliary compressor 512 can correspond to the auxiliary compressor 130 in the example of FIG. 1. For example, the auxiliary compressor 512 can replace an engine-bleed heat exchanger (e.g., the engine-bleed heat exchanger 132 in the example of FIG. 1) that was included in the air inlet 502 of the original aircraft 102. As an example, the engine-bleed heat exchanger of the original aircraft 102 was configured to provide pressurized air for cooling a number of systems including the cockpit. However, given the engine-bleed air can include potentially hazardous particulate (e.g., smoke, oil, etc.), which may be harmful to the pilot and/or systems of the original aircraft 102 that need to be cooled. However, the auxiliary compressor 512 can instead generate the pressurized air based on the ram-air that enters the air inlet 502, as opposed to using engine-bleed air.

As demonstrated in the example of FIG. 5, the pressurized air generated by the auxiliary compressor 512 can also be provided to the engine-face heat exchanger 506, and then to the ACM system 514. The pressurized air is thus cooled by the engine-face heat exchanger 506, further cooled (e.g., to sub-freezing temperatures) by the ACM 514. The air from the ACM 514 is thus provided to the engine-face heat exchanger 506 and provided from the ACM 514 to cool the systems of the retrofitted aircraft, including the ECS, as demonstrated at 516. The ACM 514 provides sub-freezing turbine-discharge air as demonstrated at 518. Accordingly, the cockpit and other ECS systems can be cooled with "cleaner" air than the engine-bleed air by implementing the auxiliary compressor 512.

As described previously, the cooling system 114 (e.g., an air-cycle machine) can be part of an ECS of the original aircraft 102, which can be retained in the retrofitted aircraft. For example, the cooling system 114 can include, among other cooling features, an interface for an active electronically scanned array (AESA) RADAR liquid-cooling system. However, as described previously, the existing cooling system 114 can be augmented by including the electrically-driven auxiliary compressors 512 drawing air from the air inlets 502 internal to the main inlets of the original aircraft 102, such that pre-cooling of the compressor air can be accomplished with the engine-face heat exchanger 506 to provide pressurized sub-freezing air. At altitude, the pressurized sub-freezing air is readily available in the form of the ram-air, such as to allow the auxiliary compressors 512 to operate at a lower RPM, on average, to provide for an efficient and highly effective temperature control environment for the retrofitted aircraft.

Additionally, in the example of FIG. 5, the engine-face heat exchanger 506 is demonstrated as providing cooling for a DE coolant fluid. As an example, the DE coolant fluid can be a suitable refrigerant which is evaporated at "near-room" temperature by the directed-energy unit and then condensed by heat exchange with engine-inlet air, where the corresponding vapor cycle pump may operate at a variable pressure sufficient to ensure that the DE-heated refrigerant is warmer than engine-inlet air. For example, a practical limitation of a DE weapon, such as included in the fuselage pod 302, can be immense heat generation that can limit the frequency of activation of the DE weapon. For example, near-term DE weapon efficiency is about 33%, such that of approximately 300 kW, approximately 100 kW is expended for the DE unit, and approximately 200 kW is rejected as heat. However, by implementing the retrofit air inlet heat exchange system 500, the retrofitted aircraft can provide for significantly greater cooling capability than the original aircraft 102 as the retrofitted aircraft takes strong advantage of the readily-available and generous heat sink of engine-inlet air, with only a modest temperature rise thereof. As a result, the retrofit engine-inlet heat exchange system 500 can allow a DE weapon to continuously fire without being subject to the vulnerability in aerial combat of "recharge delay."

Figure 6:
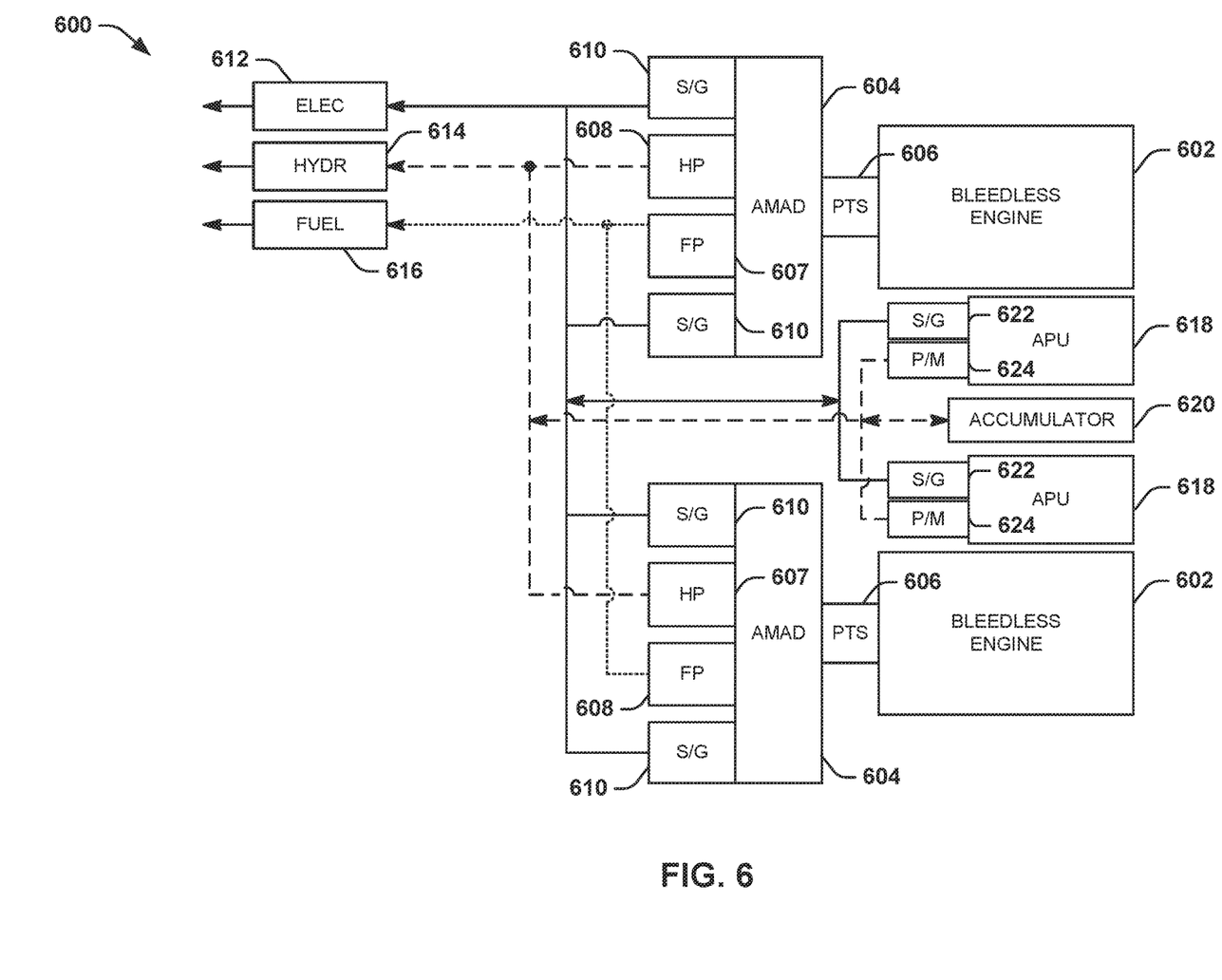
FIG. 6 illustrates an example diagram of a retrofit electronic system.

FIG. 6 illustrates an example diagram of a retrofit electronic system 600. The retrofit electronic system 600 can correspond to the retrofit electronics 124 in the example of FIG. 1. Therefore, reference is to be made to the example of FIG. 1 in the following description of the example of FIG. 6. For example, the retrofit electronic system 600 can be implemented during a second retrofit stage of the aircraft retrofit system (e.g., weapons and subsystems transformation).

The retrofit electronic system 600 includes the engines 602 (e.g., corresponding to the engines 208) that can be configured as bleedless engines. The engines 602 are coupled to a respective set of airframe-mounted accessory drives (AMADs) 604 via respective power transmission shafts (PTS) 606. The AMADs 604 can each be configured to operate a hydraulic pump 607, a fuel pump 608, and a pair of starter generators 610. In the example of FIG. 6, the electrical systems are interconnected by solid lines, the hydraulic systems are interconnected by dashed lines, and the fuel systems are interconnected by dotted lines, with each of the lines representing the flow and/or transmission of power, hydraulic fluid, and fuel, respectively. The power is provided to/from an electrical distribution block 612, the hydraulic fluid is provided to/from a hydraulic distribution block 614, and the fuel is provided to/from a fuel distribution block 616, with each of the respective blocks 612, 614, and 616 being configured to distribute respective resources to various parts of the retrofitted aircraft.

As an example, the starter generators 610 can be part of the aircraft retrofit system 104 and can each provide approximately 120 kW of power. As an example, the starter generators 610 can correspond to the retrofit starter generators 142 in the example of FIG. 1. In addition, the retrofit electronic system 600 includes a pair of APUs 618 that can be configured as bleedless or "low-bleed", APUs. As an example, the APUs 618 can correspond to the APUs 140 in the example of FIG. 1, such that the APUs 618 can be arranged to breathe high-quality air at a fuselage input port that was associated with the ram-air exit stacks 138 of the original aircraft 102. For example, the APUs 618 can each be configured to generate approximately 100 kW of power. For example, on the ground, the APUs 618 are can start with energy stored in a hydraulic accumulator 620 sequentially powering either APU self-start hydraulic motor 624 which can then convert to an auxiliary hydraulic pump, recharging the accumulator and meeting other hydraulic demands, once the APU nearly reaches its governed speed. Thereafter, each APU can drive an auxiliary starter-generator operating as a generator. If, for example, either of the APUs has flamed out in flight, it can be rapidly re-started with its auxiliary starter-generator operating as a starter and drawing energy from the electrical-power bus. In the event of all engines and APUs simultaneously flamed out, the retrofitted aircraft can be stabilized in a high-speed glide by engine-windmilling hydraulic power as one APU can be re-started with hydraulic bus and/or accumulator-derived power, followed by the first of two engine restarts, each via the APU-to-engine electric-power link.

As described previously, the retrofitted aircraft can provide a significant increase in the amount of generated power by the starter generators 610 and the APUs 618. For example, the added pair of approximately 100-kW APUs 618 can electrically power the ECS over much of the flight envelope of the retrofitted aircraft. The fuel burn for the flight-continuous APUs 618 can be largely offset by the efficiency gains of the bleedless engines 602. Additionally, the AMAD-mounted starter generators 610 and associated control units can collectively reject about 60 kW of heat load, which can be largely independent of demand. Furthermore, implementing the starter generators 610 and the APUs 618 can enable the retrofitted aircraft to host systems on the retrofitted aircraft that can require significant amounts of power, such as a DE weapon. Accordingly, the retrofit electronic system 600 can accommodate significantly high power consuming current and developing technologies.

Figure 7:
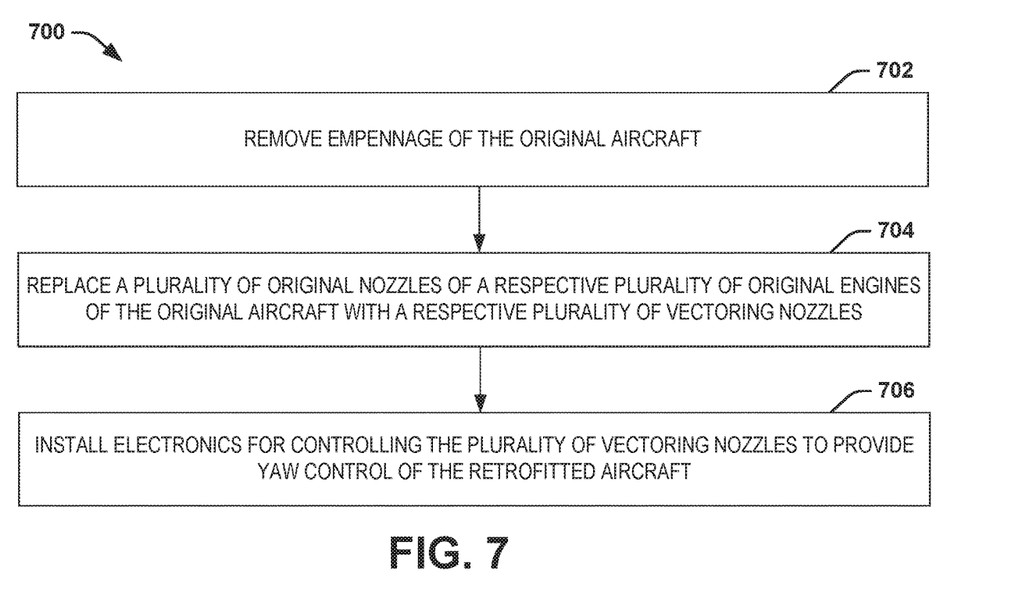
FIG. 7 illustrates an example of a method for retrofitting an original aircraft to provide a retrofitted aircraft.
Figure 8:
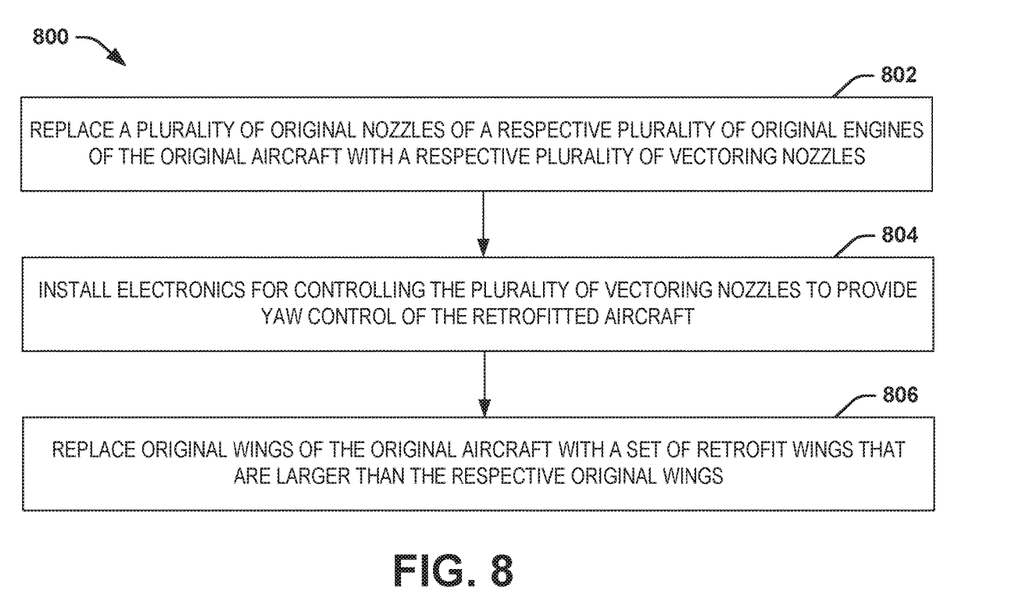
FIG. 8 illustrates another example of a method for retrofitting an original aircraft to provide a retrofitted aircraft.

In view of the foregoing structural and functional features described above, an example method will be better appreciated with reference to FIGS. 7 and 8. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an integrated circuit, processor, or a controller, for example.

FIG. 7 illustrates an example of a method 700 for retrofitting an original aircraft (e.g., the original aircraft 102) to provide a retrofitted aircraft (e.g., the retrofitted aircraft 200, 300, and 404). At 702, empennage (e.g., the (e.g., the tailfins 204 and tailplanes 206) of the original aircraft is removed. At 704, a plurality of original nozzles (e.g., the original nozzles 120) of a respective plurality of original engines (e.g., the original engines 112) of the original aircraft are replaced with a respective plurality of vectoring nozzles (e.g., the vectoring nozzles 118). At 706, electronics (e.g., the retrofit electronics 124) for controlling the plurality of vectoring nozzles are installed to provide yaw control of the retrofitted aircraft.

FIG. 8 illustrates an example of a method 800 for retrofitting an original aircraft (e.g., the original aircraft 102) to provide a retrofitted aircraft (e.g., the retrofitted aircraft 200, 300, and 404). At 802, a plurality of original nozzles (e.g., the original nozzles 120) of a respective plurality of original engines (e.g., the original engines 112) of the original aircraft are replaced with a respective plurality of vectoring nozzles (e.g., the vectoring nozzles 118). At 804, electronics (e.g., the retrofit electronics 124) for controlling the plurality of vectoring nozzles are installed to provide yaw control of the retrofitted aircraft. At 806, original wings (e.g., the original wings 128) of the original aircraft are replaced with a set of retrofit wings (e.g., the retrofit wings 126) that are larger than the respective original wings. Each of the retrofit wings includes an internal fuel tank to store a greater amount of fuel than the original wings of the original aircraft. Each of the retrofit wings also includes a plurality of ailerons (e.g., the ailerons 214 and 216) configured to provide aviation control and yaw control of the retrofitted aircraft.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A method for retrofitting an original aircraft to provide a retrofitted aircraft, the method comprising:
   providing the original aircraft with original engines and empennage;
   removing the empennage of the original aircraft;
   replacing the original engines with bleedless engines, the bleedless engines comprising a plurality of multi-axis vectoring nozzles; and
   installing electronics for controlling the plurality of multi-axis vectoring nozzles to provide yaw control of the retrofitted aircraft.

2. The method of claim 1, further comprising replacing original wings of the original aircraft with a set of retrofit wings that are larger than the respective original wings, each of the retrofit wings being configured to store a greater amount of fuel than the original wings of the original aircraft.

3. The method of claim 2, wherein replacing the original wings comprises at least one of installing each of the retrofit wings comprising at least one of a plurality of ailerons configured to provide yaw control of the retrofitted aircraft and at least one auxiliary power unit (APU) bleed jet system to provide supplemental yaw control of the retrofitted aircraft.

4. The method of claim 1, further comprising installing an auxiliary compressor into the original aircraft to provide enhanced cooling of electronic components of the retrofitted aircraft relative to the original aircraft.

5. The method of claim 1, further comprising installing an auxiliary compressor configured to provide compression of ram-air provided from a ram-air input associated with an engine intake, the compressed ram-air providing cool air for an electric cabin system via an air-cycle machine (ACM), wherein the auxiliary compressor is configured to replace an engine-bleed heat exchanger configured to provide cooling of engine bleed air associated with the original aircraft.

6. The method of claim 1, further comprising installing a plurality of starter generators into the original aircraft that generate electricity from operation of the bleedless engines to provide enhanced power to electronic components of the retrofitted aircraft relative to the original aircraft.

7. The method of claim 1, further comprising installing at least one auxiliary power unit (APU) in the retrofitted aircraft with an air inlet configured to replace a ram-air exit stack associated with the fuselage of the original aircraft.

\* \* \* \* \*